US005337324A

United States Patent [19]

Ohtsu et al.

[11] Patent Number: 5,337,324

[45] Date of Patent: Aug. 9, 1994

[54] METHOD FOR CONTROLLING MOVEMENT OF NEUTRAL ATOM AND APPARATUS FOR CARRYING OUT THE SAME

[75] Inventors: Motoichi Ohtsu, Tokyo; Hirokazu Hori, Yamanashi, both of Japan

[73] Assignee: Tokyo Institute of Technology, Meguro, Japan

[21] Appl. No.: 22,519

[22] Filed: Feb. 25, 1993

[30] Foreign Application Priority Data

Jun. 11, 1992 [JP] Japan ................................ 4-152442

[51] Int. Cl.[5] ................................ H01S 3/13

[52] U.S. Cl. ................................ 372/32; 372/6; 372/701; 385/117; 359/385; 359/387

[58] Field of Search ................ 372/32, 6, 701, 109; 385/29, 117; 359/385, 387

[56] References Cited

U.S. PATENT DOCUMENTS 4,941,726 7/1990 Russell et al. ................ 372/6
5,167,444 12/1992 Hall ................ 372/32

FOREIGN PATENT DOCUMENTS 0004103 1/1983 Japan ................ 372/701
0271409 11/1988 Japan ................ 372/701

OTHER PUBLICATIONS

Journal of Japanese Society of Applied Physics, No. 60, Sep. 1991, pp. 864–874, "Laser Cooling of Neutral Atoms and Its Applications", Fujio Shimizu.

*Primary Examiner*—Georgia Y. Epps
*Attorney, Agent, or Firm*—Spencer, Frank & Schneider

[57] ABSTRACT

In order to control the movement of a single neutral atom or a small number of neutral atoms to trap the neutral atom or atoms at a distal end of an optical fiber probe, a laser light having a frequency which is slightly lower than a resonance frequency of the atom is made incident upon a proximal end of the optical fiber probe, and an evanescent light is generated from a sharpened distal end of the optical fiber probe whose tip is sharpened such that its radius of curvature is smaller than one wavelength of the laser light. The distal end of the optical fiber probe is brought close to the neutral atom or atoms to trap the neutral atom or atoms within an existing volume of the evanescent light. When the light frequency is changed to a value slightly higher than the resonance frequency of the atom, the trapped neutral atom or atoms are pushed out of the existing volume of the evanescent light. The crystal growth can be performed with a single atom level.

18 Claims, 6 Drawing Sheets

METHOD FOR CONTROLLING MOVEMENT OF NEUTRAL ATOM AND APPARATUS FOR CARRYING OUT THE SAME

BACKGROUND OF THE INVENTION

1. Field of the Invention

The present invention relates to a method of controlling the movement of a single neutral atom or a small number of neutral atoms, and more particularly to a method of trapping a single neutral atom or a small number of neutral atoms within a space of small volume at a distal end of an optical fiber probe. The present invention also relates to an apparatus for controlling the movement of a single neutral atom or a small number of neutral atoms to trap said neutral atom or atoms within a small space at a distal end of a probe and for releasing said trapped neutral atom or atoms at a desired position.

Recently, intensive studies have been effected for a method of controlling the movement of a group of atoms with the aid of light to trap it in a vacuum and a method of controlling the movement of a single ion by utilizing an electromagnetic microwave to trap it within a limited space. The former method is called the method of optical molasses by laser cooling and the latter method is called the ion trap method.

The former method can trap a group consisting of a relatively large number of atoms by the use of laser light, but this method can not capture a single atom or a few atoms. The latter method can capture a single ion, but can not trap a neutral atom having no electric charge. Due to the above mentioned limitations, the known atom trapping methods can not be utilized for wide applications. For instance, the silicon atom, germanium atom and arsenic atom, which are important in semiconductor device engineering can not be captured.

SUMMARY OF THE INVENTION

The present invention has for its object to provide a novel and useful method of controlling the movement of a single neutral atom or a small number of neutral atoms, which can overcome the drawbacks of the known methods and can control the movement of a single neutral atom or a small number of neutral atoms to trap said neutral atom or atoms within a limited space. According to the invention, a small number of atoms means not only a few atoms, but also several atoms up to about ten atoms.

According to the invention, a method of controlling the movement of a single neutral atom or a small number of neutral atoms comprises:

making incident a laser light having a light frequency which is lower than a resonance frequency of an atom whose movement is to be controlled, by about 0.1 to 10 times a width of an atomic resonance spectrum line upon a proximal end of an optical fiber probe whose distal end is sharpened such that the laser light could not be exited, but an evanescent light is generated;

trapping a single neutral atom or a small number of neutral atoms within an existing volume of the evanescent light by bringing the distal end of the optical fiber probe close to said neutral atom or atoms; and controlling the movement of said trapped neutral atom or atoms by controlling the light frequency of said laser light.

It is another object of the invention to provide an apparatus for carrying out the above mentioned method in an efficient and positive manner.

According to the invention, an apparatus for controlling the movement of a single neutral atom or a small number of neutral atoms comprises:

a laser light source device for emitting a laser light;

a light frequency controlling means for changing a light frequency of said laser light from a first frequency which is lower than a resonance frequency of an atom to be trapped by about 0.1 to 10 times a width $\gamma$ of an atomic resonance spectrum line to a second frequency which is higher than said resonance frequency by about 0.1 to 10 times said width of the atomic resonance spectrum line;

an optical fiber probe having a proximal end upon which said laser light is made incident and a sharpened distal end from which an evanescent light is generated; and a driving means for moving said sharpened distal end of the optical fiber probe; whereby the light frequency of the laser light is set to said first frequency to trap a single neutral atom or a small number of neutral atoms within an exiting volume of the evanescent light generated from the sharpened distal end of the optical fiber probe, and then the light frequency of the laser light is changed into said second frequency to push said trapped neutral atom or atoms out of the existing volume of the evanescent light.

It is still another object of the present invention to provide a method of trapping a single neutral atom or a small number of neutral atoms in an efficient and positive manner.

According to the invention a method of trapping a single neutral atom or a small number of neutral atoms comprises:

making incident a laser light having a light frequency which is lower than a resonance frequency of a neutral atom under consideration by about 0.1 to 10 times a width of an atomic resonance spectrum line upon a proximal end of an optical fiber probe whose distal end is sharpened such that the laser light could not exit therefrom, but an evanescent light is generated; and trapping a single neutral atom or a small number of neutral atoms within an existing volume of the evanescent light.

DESCRIPTION OF THE PREFERRED EMBODIMENTS

In case of utilizing light as a tool for controlling the movement of a single atom or a small number of atoms, the following conditions have to be satisfied.

(1) The light frequency can be set to a resonance frequency $\nu$ of an atom under consideration, the fluctuation of the light frequency is small, and the light frequency is not varied for a long time period.

(2) Light energy can be locally concentrated within a very small space, so that a spatial changing ratio of the energy density, the value of the wave number vector and a spatial changing ratio of the wave number vector are large.

According to the invention, in order to satisfy the above mentioned first condition, use is made of a laser light source. Various laser light sources for emitting laser light beams having different wavelengths are readily available, so that the laser light source is very suitable for controlling the movement of various kinds of atoms. For instance, in the case of using a semiconductor laser, a fluctuation of the oscillating frequency can be suppressed to a large extent by controlling automatically the injection current and operation temperature. Further the light frequency $\nu$ can be scanned over a wide range by the frequency conversion using a non-linear optical element, so that the light frequency can be easily set to the desired resonance frequency of an atom whose movement is to be controlled. For instance, it is possible to obtain a semiconductor laser whose width of an oscillating spectrum line $\Delta\nu$ is about 250 Hz, said spectrum line width being a measure for evaluating the fluctuation in the light frequency. This value of $\Delta\nu$ is about $1\times10^{-4}$ of a quantum fluctuation specific to a laser in which the above mentioned automatic control is not effected. Moreover, by utilizing the optical control in addition to the above mentioned control, the value of $\Delta\nu$ can be further reduced to about 7 Hz. For instance, the light frequency of laser light having a wavelength of 830 nm is $3.6\times10^{14}$, so that $\nu/\Delta\nu$ becomes very large such as about $5\times10^{13}$. It should be noted that it is not always necessary to suppress the fluctuation in the frequency of the laser light to such a small value. According to the invention, about 1 MHz of the fluctuation in the frequency of the laser light may be allowed. According to the invention, a desired result can be attained if the value of $\nu/\Delta\nu$ is not less than $1\times10^{7}$.

Figure 1:
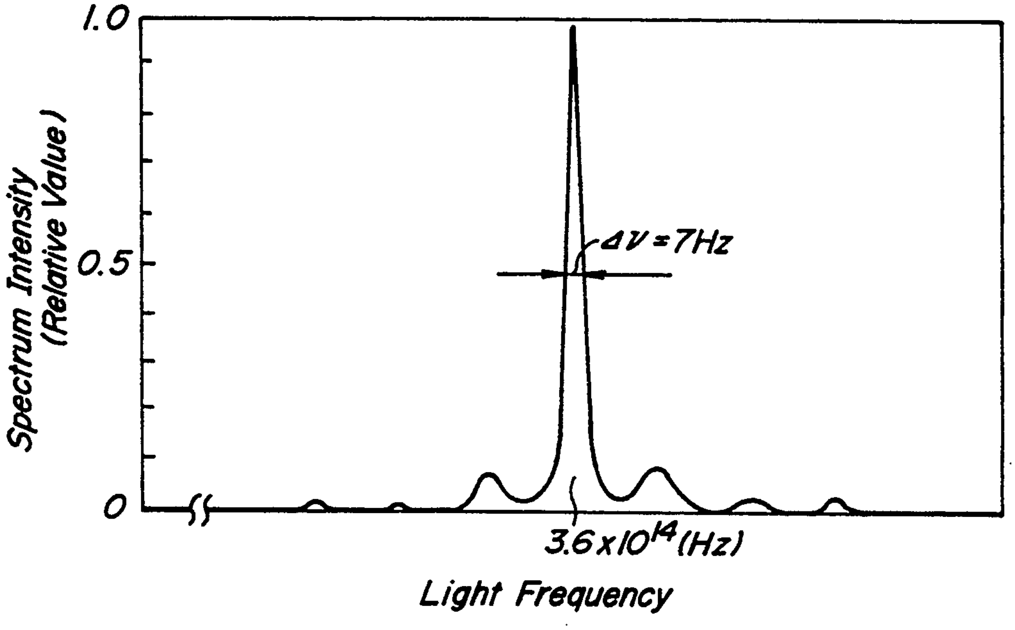
FIG. 1 is a graph showing the distribution of spectrum strength of the laser light.

FIG. 1 is a graph showing the strength of an oscillating spectrum of laser light emitted from a semiconductor laser for which the above mentioned automatic control for the injection current and operation temperature is performed. The spectrum line width $\Delta\nu$ at $3.6\times10^{14}$ Hz is about 7 Hz.

Furthermore, in order to satisfy the above second condition, according to the invention, use is made of an optical fiber probe whose distal end is sharpened. That is to say, the distal end of the optical fiber probe is sharpened such that the radius of curvature a is smaller than the wavelength $\lambda$; for example, in the range of about 10 to 30 nm. Then, the laser light which is made incident upon a proximal end of the optical fiber probe could not exit from the distal end, but evanescent light is exuded or generated from the sharp distal end. The power of the evanescent light is very small, but the evanescent light is locally existent within a space having a very small volume of $\lambda^3$, so that the power density and the spatial variation ratio of the power density are very large. Further the wave number vector of the evanescent light is parallel with a surface of the distal end of the optical fiber probe and has a large value. The spatial variation ratio of the wave number vector is also very large. For instance, when laser light having a power of 40 mW is made incident upon the proximal end of the optical fiber probe, the power density of the evanescent light generated from the sharp distal end becomes a very large value of more than 100 W/cm$^2$.

According to the invention, the laser light whose light frequency can be set to the resonance frequency $\nu_r$ of the atom under consideration and whose fluctuation in the light frequency is very small is made incident upon the proximal end of the optical fiber probe and the evanescent light is exuded from the sharp distal end. In this condition, the distal end of the optical fiber probe is moved close to the atom to be trapped. Now it is assumed that the light frequency $\nu$ of the laser light is set to a value slightly lower than the resonance frequency $\nu_r$ of the relevant atom. When the atom is jumped into the field of the evanescent light, the atom interacts with the evanescent light by means of the absorption and emission of light. Then, the movement of the atom due to the interaction between the atom and the evanescent light is considered. The distal end of the optical fiber probe has a curvature such that the polar coordinate system is more suitable for the calculation, but here in order to understand the movement of the atom straightforwardly, use is made of the orthogonal coordinate system.

Figure 2B:
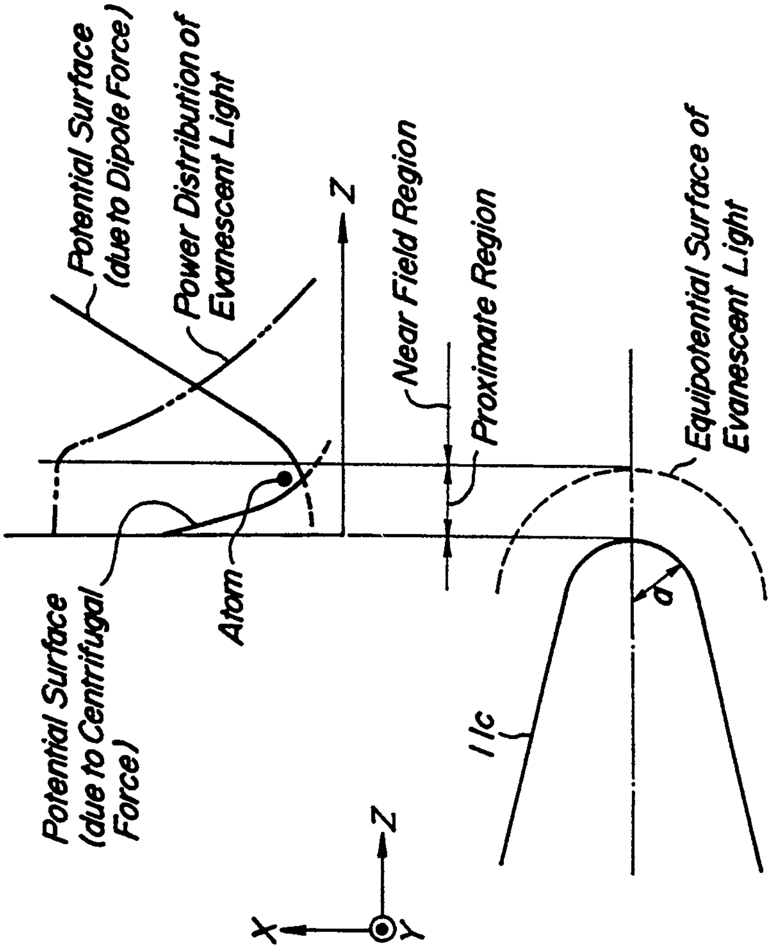
FIGS. 2A and 2B are graphs representing the function for trapping the atom within the existing volume of the evanescent light according to the invention.
Figure 2A:
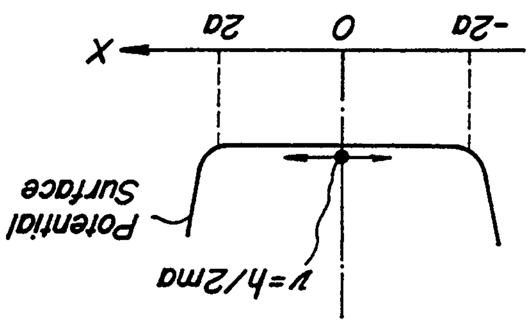

Now, the longitudinal axis of the optical fiber probe is set to the Z axis, and then a potential surface for providing the movement of the atom in the X direction perpendicular to the Z direction can be represented as shown in FIG. 2A. Now it is assumed that a single atom is jumped into the potential field from the X direction at a speed v. This atom is irradiated by light coming from the forward and backward directions regardless of the position and angle at which the atom enters into the field of light. This is due to the fact that the distal end of the optical fiber probe is sharpened symmetrically with respect to the longitudinal axis and the wave number vector of the evanescent light is parallel with the probe surface. Due to the Doppler effect, the frequency of light irradiating the atom from the forward direction becomes $\nu+v/a$, wherein a is the radius of curvature of the distal end of the optical fiber probe. It should be noted that the Doppler shift $v/a$ is not equal to the Doppler shift $\nu v/c$ (wherein c is the velocity of light) which is usually obtained for ordinary light propagating in free space, but is larger than said value by $\lambda/a$ ($>1$). Such a large Doppler shift is introduced due to the characteristics of the evanescent light which has a large wave number vector, i.e. the evanescent light may be considered to be a photon having a finite mass.

Therefore, when the Doppler shift $\nu+v/a$ is equal to the resonance frequency $\nu_r$ of the relevant atom, the atom absorbs the light. After that the atom emits light by natural radiation and the frequency of the emitted light is equal to the resonance frequency $\nu_r$ of the relevant atom. Therefore, the atom loses energy by an amount $hv/a$ (wherein h is a Planck's constant) which is proportional to the Doppler shift by repeating the light absorption and emission, so that the atom is decelerated. Contrary to this, a quantum dynamic probability that the light irradiates the atom from the backward direction is relatively small. This is due to the fact that the sign of the Doppler shift is opposite to that for the light irradiating the atom from the forward direction and the laser light has the light frequency $\nu$ which is slightly lower than the resonance frequency $\nu_r$. Therefore, the atom is gradually decelerated and arrives at the center of the potential surface. The final speed of the atom becomes equal to h/2ma (m is the mass of the atom).

After the atom has arrived at the center of the potential surface, the atom absorbs and emits the light and moves right and left along the potential surface at a velocity of $\pm h/2ma$. When the atom approaches the periphery of the potential surface where the velocity of the atom includes a Z component whose amount is dependent upon the radius of curvature a of the distal end of the optical fiber probe, the influence of the potential corresponds to the attractive force in the Z direction as will be explained later. This means that a high potential varier is existent at the periphery of the potential surface shown in FIG. 2A, and therefore the atom could not move beyond the periphery of the potential surface. In this manner, the atom is trapped within a circular area having a center on the Z axis and a radius of 2a. In other words, the atom can be found at any point on this circular area. For an alkali metal atom, the above final velocity h/2ma is 0.2 m/s if the radius a of curvature of the distal end of the optical fiber probe is set to 10 nm. An equivalent temperature $T_{eq}$ of the thermal movement corresponding to this velocity is on the order of 0.1 mK. That is to say, a single atom having a temperature near the absolute temperature of zero is moving along the circular area having a diameter of 2a.

FIG. 2B illustrates the Z direction dependency of the potential energy of the atom existing within the light field. As explained above, $\nu<\nu_r$, so that there is produced a force for attracting the atom toward the distal end of the optical fiber probe. In FIG. 2B, the Z direction dependency of the evanescent light power is also shown. A region $0<z<a$ is called a proximate region in which the power of the evanescent light is not substantially changed in dependence upon z. A region $a<z<\lambda$ is called a near field region in which the power is changed in proportion to $z^{-3.7}$. That is to say, in the near field region, the power of the evanescent light has a point of inflection at $z\simeq a$. Therefore, the potential surface of the atom has also a point of inflection, so that the atom is subjected to the largest force of the light at this point. In the proximate region, the centrifugal force of the moving atom becomes large, and thus the atom could not be attracted to the distal end face of the optical fiber probe even if the atom is subjected to the above mentioned attracting force. In this manner, the atom is trapped by the evanescent light at a point separated from the distal end surface by a distance of $z\simeq a$.

Now the depth $\Delta W$ of atom trapping potential, represented by an equivalent temperature $T_{eq}(\equiv\Delta W/k_b$: $k_b$ is Boltzman's constant) of the movement of the atom, will be calculated for an alkali metal atom. According to the invention, the power of the laser light incident upon the optical fiber probe has to be set to such a value that the power of the evanescent light becomes larger than the saturation power of the atom, said saturation power being specific to the construction of the atom. Then, the equivalent temperature $T_{eq}$ becomes on the order of 1 mK. This means that a laser light power of several mW is used and the atom has to be cooled at or below the temperature of 1 mK. By utilizing the above mentioned method of optical molasses by laser cooling, it is possible to cool preliminarily a group of atoms at several $\mu$K. Although the group of atoms is cooled, a single atom or a few atoms can be trapped within the existing volume of the evanescent light due to the repelling force of mutual atoms. It should be noted that whether or not the atom is trapped within the field of light can be easily checked by the fluorescence observation.

Instead of utilizing the method of optical molasses by laser cooling, the atom can be cooled by liquid nitrogen. Moreover, in general, atoms having the equivalent temperature of 1 mK are existent at a probability of 1/100%, so that it is not always necessary to effect the above explained preliminary cooling.

As explained above, according to the invention, it is possible to trap or capture a single atom or a small number of atoms within the existing volume of the evanescent light exuded from the sharp distal end of the optical fiber probe. Next, the distal end is moved into a desired position, e.g. a point above a cooled crystal substrate, and then the light frequency of the laser light is changed into a frequency slightly higher than the resonant frequency of the atom. As a result of this, the atom is heated and accelerated and then is pushed out of the existing volume of the evanescent light. Then, the atom drops on the substrate and is fixed on its surface by the van der Waals' force or any other chemical coupling force. In this manner, the crystal growth can be performed with a single crystal level on the crystal substrate.

As stated above, according to the invention, use is made of laser light having a light frequency near the resonance frequency $\nu_r$ of an atom. Wavelengths of laser light suitable for use with various atoms are shown in the following table.

TABLE 1

| atom | wavelength | atom | wavelength |
|---|---|---|---|
| Rb | 780.0 | K | 766.5 |
| Li | 670.8 | Ca | 422.7 |
| Be | 234.9 | Cu | 327.4 |
| B:1 | 249.7 | Ga | 403.3 |
| B:2 | 249.8 | Sr | 460.7 |
| O | 777.5 | Ag | 328.1 |
| Na | 589.0 | Cs | 852.1 |
| Mg | 285.2 | Au | 267.6 |
| Al | 394.4 | Hg | 253.7 |
| Si | 252.4 | Pb | 368.4 |

According to the invention, the distal end of the optical fiber probe is sharpened such that the evanescent light is generated from the distal end. It is sufficient that the radius of curvature of the sharp distal end is smaller than the wavelength $\lambda$ of the laser light, but the radius of curvature has an optimum value.

Figure 3:
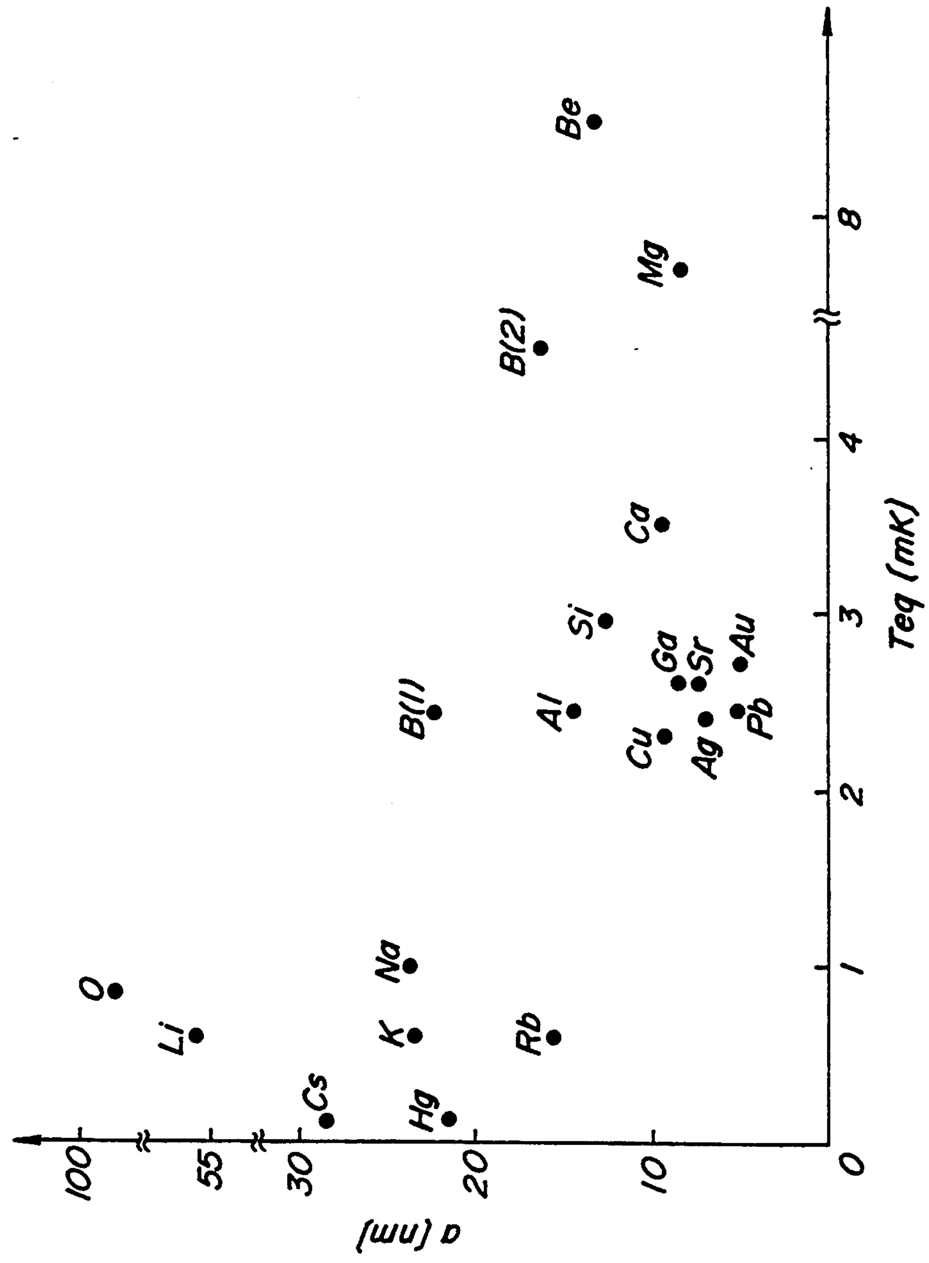
FIG. 3 is a graph illustrating the relationship between the radius of curvature of the distal end of the optical fiber and the equivalent temperature for various atoms.

FIG. 3 is a graph showing the relationship for various atoms between the radius of curvature a of the sharp distal end of the optical fiber probe and the equivalent temperature $T_{eq}$ representing the depth of the trapping potential by the evanescent light which is leaked out of the distal end of the optical fiber probe when laser light having a power of several mW is made incident upon the proximal end of the optical fiber probe. For instance, for the silicon atom, the radius of curvature a is most preferably set to about 13 nm. Therefore, the radius of curvature a of the distal end of the optical fiber probe for the silicon atom is preferably set to 10 to 30 nm.

If the radius of curvature a is set to be too large, the force for trapping the atom becomes weak and the atom could not be trapped effectively. Further, if the radius of curvature is set to be too small, the atom passes through the existing volume of the evanescent light and could not be captured. Therefore, the radius of curvature of the distal end of the optical fiber probe has to be set to a value within a preferable range in accordance with the atom under consideration and the laser power.

Figure 4:
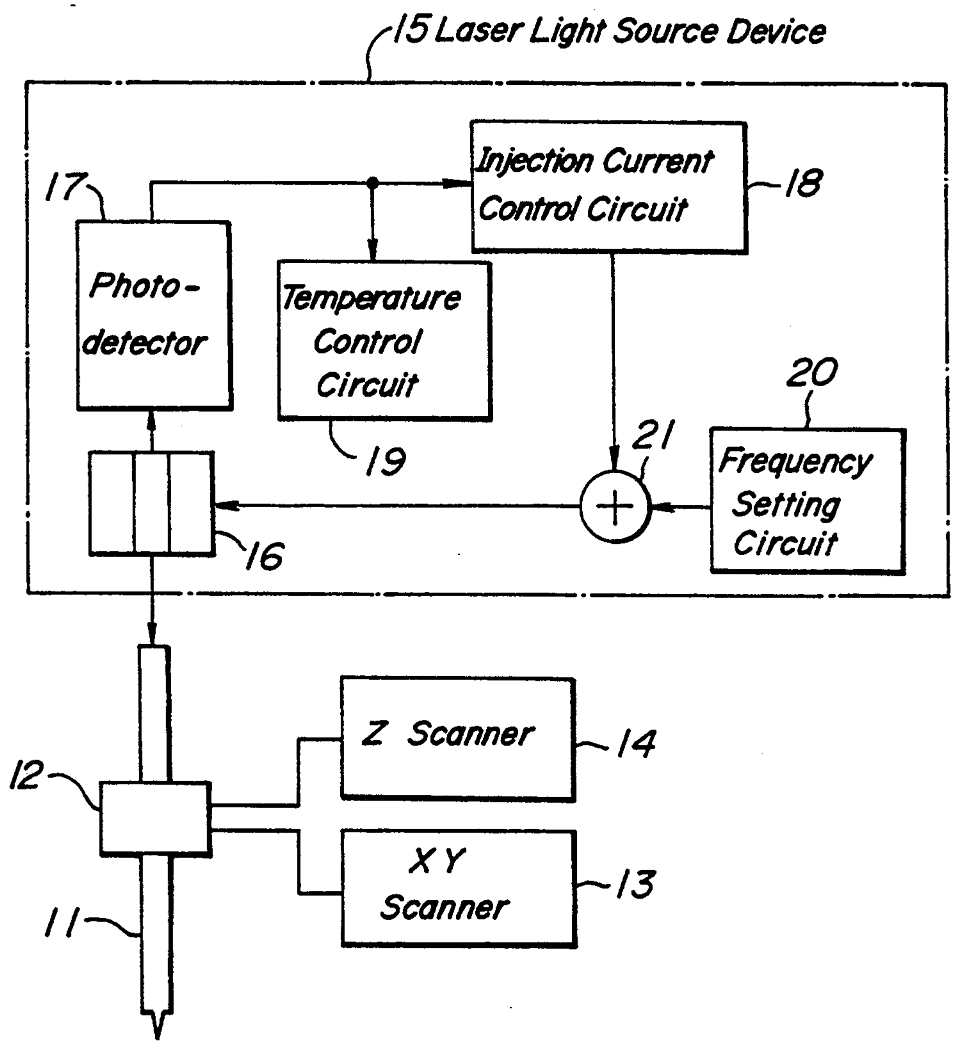
FIG. 4 is a schematic view denoting an embodiment of the apparatus for controlling the movement of the atom according to the invention.

FIG. 4 is a schematic view showing an embodiment of the apparatus for controlling the movement of a small number of atoms including a single atom according to the invention. A base plate 12 for supporting an optical fiber probe 11 is held so as to be movable in the X, Y and Z directions by means of an XY scanner 13 and a Z scanner 14. A laser light source device 15 is arranged in opposition to a proximal end of the optical fiber probe 11. The laser light source device 15 comprises a semiconductor laser 16 including non-linear optical element having a frequency converting function, a photodetector 17 for receiving a laser light beam emitted by the semiconductor laser, an injection current control circuit 18 for controlling an injection current to the semiconductor laser in accordance with an output signal of the photodetector, a temperature control circuit 19 for controlling the operation temperature of the semiconductor laser, a reference frequency setting circuit 20 for setting the light frequency of the laser light beam emitted by the semiconductor laser, and a summing circuit 21 for summing output signals from the injection current control circuit 18 and reference frequency setting circuit 20. The XY scanner 13 and Z scanner 14 are formed by piezoelectric actuators.

By using the non-linear optical element in the laser light source device 15, the light frequency $\nu$ of the laser light emitted from the semiconductor laser 16 can be swept over a wide range. In the present embodiment, the semiconductor laser 16 is formed by a GaAs semiconductor laser for emitting laser light having a wavelength of 830 nm. In this case, the width $\Delta\nu$ of the spectrum line of the laser light can be made small such as about 250 Hz. Further, by providing the control circuits 19 and 20, $\Delta\nu$ can be suppressed up to 7 Hz. By further improving the automatic control device, $\Delta\nu$ will be made much smaller such as about 58 mHz.

Figure 5A:
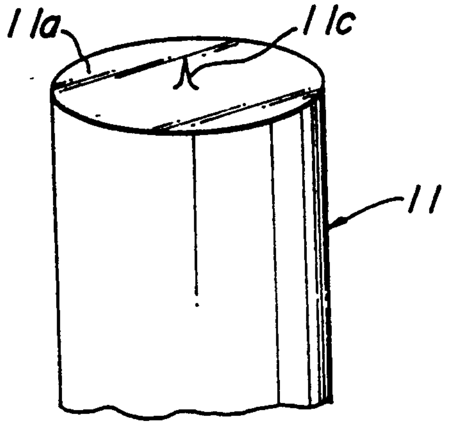
FIGS. 5A, 5B and 5C are views showing the construction of the distal end of the optical fiber probe according to the invention.
Figure 5B:
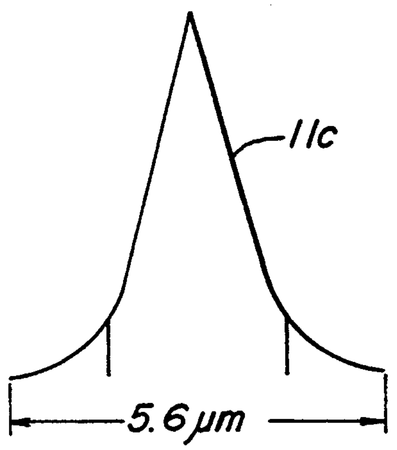
Figure 5C:
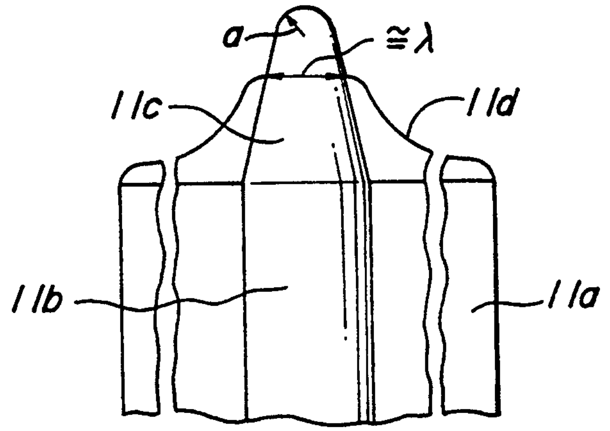

FIGS. 5A, 5B and 5C show the detailed construction of the distal end of the optical fiber probe according to the invention. The diameter of the clad 11*a* of the optical fiber probe 11 is 90 $\mu$m and the diameter of the core 11*b* is several micron meters. At the distal end of the optical fiber probe 11, the core 11*b* is protruded and is shaped into a conical projection 11*c* having a sharp tip. In the present embodiment, the projection 11*c* is formed by etching, but it may be formed by other methods. The height of the projection 11*c* is 5 to 6 $\mu$m and the tip angle is about 25 degrees. The radius of curvature a of the tip could not be measured precisely by the electron microscope, but can be estimated as about 10 nm. As illustrated in FIG. 5C, only a portion of the projection 11*c* whose diameter is smaller than about one wavelength $\lambda$ is exposed and the remaining portion is covered with a light shielding material film 11*d*. In the present embodiment, the light shielding film 11*d* is made of metal. In case of forming the projection 11*c* by etching, there are formed fine depressions and protrusions in the distal end surface of the optical fiber probe 11 and thus the laser light might be scattered. In order to avoid such scattering, the metal film 11*d* is provided. Therefore, if the above mentioned scattering does not occur, the metal film 11*d* may be dispensed with.

When the distal end of the optical fiber probe 11 is sharpened such that the radius of curvature a is smaller than one wavelength $\lambda$, then, the laser light projected into the proximal end of the optical fiber probe 11 could not emit from the distal end and the evanescent light is generated from the sharpened distal end.

The power of the evanescent light leaked out of the sharpened distal end of the optical fiber probe 11 is low, but its existing volume is smaller than $\lambda^3$, so that the power density and the spatial change ratio of the power density become extremely large. Moreover, the wave number vector of the evanescent light is parallel with the surface of the sharpened distal end, and the value of the wave number vector is also very large. In the present embodiment, the power of the laser light is several mW and the power density of the evanescent light is larger than 100 W/cm$^2$.

Figure 6A:
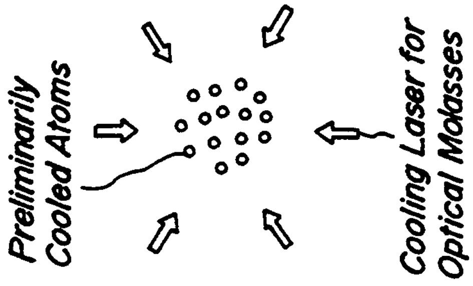
FIGS. 6A, 6B and 6C are schematic views illustrating the operation for effecting the single crystal growth by using the apparatus shown in FIG. 4.
Figure 6B:
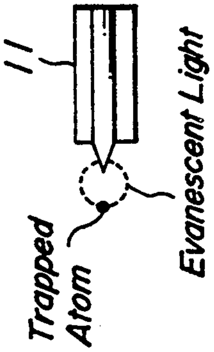
Figure 6C:
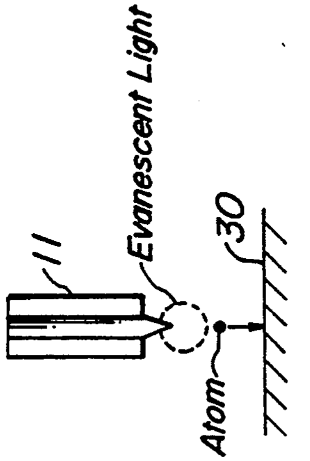

FIGS. 6A, 6B and 6C are schematic views representing successive steps for trapping a single atom and fixing the atom onto a crystal substrate by the method according to the invention. As explained above, when the laser power of the semiconductor laser 16 is several mW, it is necessary to cool preliminarily an atom to be trapped at a temperature not higher than 1 mK. This can be realized by preliminarily cooling a group of atoms to the optical molasses condition by the method of optical molasses by laser cooling. This method of optical molasses by laser cooling has been known and is described by Fujio Shimizu in "Oyo Buturi (Journal of Japanese Society of Applied Physics)", 60, 1991, page 864.

Next, a single atom in the group of atoms which is cooled in the optical molasses condition is trapped within the field of the evanescent light. To this end, the light frequency $\nu$ of the laser light is set by the light frequency setting circuit 20 to a value which is slightly lower than the resonance frequency $\nu_r$ of the atom to be trapped. In this case, the difference between $\nu$ and $\nu_r$ is preferably set to about 0.1 to 10 times the width $\gamma$ of the resonance spectrum line. Laser light having such a frequency is made incident upon the proximal end of the optical fiber probe 11 and evanescent light having the same light frequency is generated from the sharpened distal end. Then, the distal end of the optical fiber probe 11 is moved closer to an atom. The distance between the distal end of the optical fiber probe and the atom should be smaller than ten times the radius of curvature a of the distal end, preferably several times a. This can be performed by suitably driving the XY scanner 13 and Z scanner 14. In this manner, a single atom is trapped within the field of the evanescent light.

Then, the distal end of the optical fiber probe 11 is moved by means of the XY scanner 13 and Z scanner 14 into a desired position above a cooled crystal substrate 30, and after that the laser frequency setting circuit 20 is driven to change the light frequency of the laser light into a value which is slightly higher than the resonance frequency of the captured atom. Also in this case, the difference between the light frequency and the resonance frequency is preferably set to 0.1 to 10 times the width of the resonance spectrum line of the atom. When the light frequency of the laser is increased, the trapped atom is heated and accelerated, so that the atom is pushed out of the existing volume of the evanescent light and drops on the crystal substrate 30. Then, the atom is fixed on the surface of the crystal substrate 30 by the van der Waals' force or other chemical coupling force. In this manner, crystal growth can be performed with the single atom level.

Attempts have been made to move the atom on the crystal substrate or to remove the atom away from the crystal substrate by means of a scanning type tunnel electron microscope utilizing tunneling electrons. However, this known method can be applied only to inert gas atoms and other limited atoms. According to the invention, the movement of various atoms can be controlled by using laser light having a frequency corresponding to the resonance transition frequencies of the atoms. Particularly, movement of the silicon atom which is important in semiconductor device engineering can be controlled.

The present invention is not limited to the embodiments explained above, but many modifications and alternations may be conceived by those skilled in the art within the scope of the invention. Nowadays a semiconductor laser having an output power higher than 1 W is available, and if such a high power semiconductor laser is used, the present invention can be applied not only to the single atom crystal growth, but to many other applications. For instance, the application to local laser trimming is possible. In this case, by setting the frequency of the laser light to the resonance frequency of an atom to be removed, it is possible to selectively remove this atom. According to the invention, the direction in which the energy of the evanescent light is changed and the direction of the wave number vector are different from each other, and thus the present invention can be applied to a very large number of applications.

In the above explained embodiment, the laser light source comprises a semiconductor laser, but it is possible to use other lasers such as gas and solid lasers. In case of using a gas laser, the oscillation frequency can be adjusted precisely by changing the distance between resonators. Further, in the above embodiment, the frequency of the laser light is changed for various atoms by using the non-linear optical element, but the semiconductor laser may be exchanged in accordance with the atoms to be trapped.

Moreover, in order to trap the atom within the existing volume of the evanescent light more positively, the frequency of the laser light may be changed repeatedly within a range $\nu \pm (0.1 \sim 10)\ \gamma$ at a period sufficiently shorter than the reciprocal of the width $\gamma$ of the resonance spectrum line of the atom. It should be noted that according to the invention, the above mentioned periodical change in the frequency of the laser light is not always necessary.

As stated above in detail, according to the invention, the evanescent light is generated from the sharpened distal end of the optical fiber probe and a single atom or several atoms are trapped within the existing volume of the evanescent light. Therefore, the movement of a single atom or several atoms can be controlled in a precise and positive manner. That is to say, the present invention can provide a novel and useful tool like tweezers for trapping or capturing a single atom. Therefore, the present invention can afford a special means for controlling the movement of an atom locally existing within a very small space, so that the present invention can be applied not only to crystal growth with a single atom level which is important in semiconductor device engineering, but also to local and selective laser trimming.

What is claimed is:

1. A method of controlling the movement of a single neutral atom or a small number of neutral atoms comprising the steps of:

making incident laser light having a frequency which is lower than a resonance frequency of an atom whose movement is to be controlled, by about 0.1 to 10 times a width of an atomic resonance spectrum line upon a proximal end of an optical fiber probe whose distal end is sharpened such that the laser light can not exit, but an evanescent light is generated;

trapping a single neutral atom or a small number of neutral atoms within an existing volume of the evanescent light by bringing the distal end of the optical fiber probe close to said neutral atom of atoms; and controlling a movement of said trapped neutral atom or atoms by controlling the light frequency of said laser light.

2. A method according to claim 1, wherein said trapping step includes bringing the sharpened distal end of the optical fiber probe close to said neutral atom or atoms such that a distance between the sharpened distal end and the neutral atom or atoms is shorter than ten times a radius of curvature of the sharpened distal end.

3. A method according to claim 1, wherein prior to trapping said neutral atom or atoms, a group of atoms including said neutral atom or atoms is preliminarily cooled.

4. A method according to claim 3, wherein said group of atoms is cooled by the method of optical molasses by laser cooling.

5. A method according to claim 1, wherein the method further comprises the step of moving the distal end of the optical fiber probe while said neutral atom or atoms are trapped within the existing volume of the evanescent volume and the step of changing the frequency of the laser light to a frequency which is higher than the resonance frequency of the atom by about 0.1 to 10 times the width of the atomic resonance spectrum line to push said trapped neutral atom or atoms out of the existing volume of the evanescent light.

6. An apparatus for controlling the movement of a single neutral atom or a small number of neutral atoms comprising:

a laser light source device for emitting laser light;

a light frequency controlling means for changing a frequency of said laser light from a first frequency which is lower than a resonance frequency of an atom under consideration by about 0.1 to 10 times a width $\gamma$ of an atomic resonance spectrum line of the relevant neutral atom to a second frequency which is higher than said resonance frequency by about 0.1 to 10 times the width of the atomic resonance spectrum line;

an optical fiber probe having a proximal end upon which said laser light is made incident and a sharpened distal end from which an evanescent light is generated; and a driving means for moving said sharpened distal end of the optical fiber probe; whereby the light frequency of the laser light is set to said first frequency to trap a single neutral atom or a small number of neutral atoms within an exiting volume of the evanescent light generated from the sharpened distal end of the optical fiber probe, and then the light frequency of the laser light is changed into said second frequency to push said trapped neutral atom or atoms out of the existing volume of the evanescent light.

7. An apparatus according to claim 6, wherein said sharpened distal end of the optical fiber probe has a radius of curvature of about 10 to 30 nm.

8. An apparatus according to claim 6, wherein said laser light source device includes a laser light source for emitting laser light, a detector for detecting the light frequency of the laser light, and an automatic controlling means for suppressing a fluctuation $\Delta\nu$ in the light frequency $\nu$ in accordance with an output of said detector such that a value of $\nu/\Delta\nu$ becomes larger than $1\times10^7$.

9. An apparatus according to claim 8, wherein said laser light source is formed by a semiconductor laser and said controlling means includes a circuit for controlling an injection current to the semiconductor laser in accordance with the output signal of said detector.

10. An apparatus according to claim 9, wherein said controlling means further comprises a control circuit for controlling an operation temperature of the semiconductor laser in accordance with the output signal of said detector.

11. An apparatus according to claim 6, wherein said driving means is constructed such that the sharpened distal end of the optical fiber probe is moved three-dimensionally.

12. An apparatus according to claim 11, wherein said driving means comprises an XY scanner for moving the sharpened distal end of the optical fiber probe in orthogonal X and Y directions and a Z scanner for moving the sharpened distal end in a Z direction which is perpendicular to both the X and Y directions.

13. An apparatus according to claim 12, wherein said XY scanner and said Z scanner are piezoelectric actuators.

14. An apparatus according to claim 6, wherein said sharpened distal end of the optical fiber probe is formed such that a core is formed as a conical projection and a portion of the conical projection having a diameter larger than a wavelength of the laser light is covered with a light shielding film.

15. A method of trapping a single neutral atom or a small number of neutral atoms comprising the steps of:

making incident laser light having a frequency which is lower than a resonance frequency of an atom whose movement is to be controlled by about 0.1 to 10 times a width of an atomic resonance spectrum line upon a proximal end of an optical fiber probe whose distal end is sharpened such that the laser light can not exit therefrom, but an evanescent light is generated; and trapping a single neutral atom or a small number of neutral atoms within an existing volume of the evanescent light.

16. A method according to claim 15, wherein said trapping step includes bringing the sharpened distal end of the optical fiber probe close to said single neutral atom or atoms such that a distance between the sharpened distal end and the neutral atom or atoms is shorter than ten times a radius of curvature of the sharpened distal end.

17. A method according to claim 15, wherein prior to trapping said neutral atom or atoms, a group of atoms including said neutral atom or atoms is preliminarily cooled.

18. A method according to claim 17, wherein said group of atoms is cooled by the method of optical molasses by laser cooling.

* * * * *